US005328749A

United States Patent [19]

Noda et al.

[11] Patent Number: 5,328,749

[45] Date of Patent: Jul. 12, 1994

[54] RESIN-COATED PAPER

[75] Inventors: Touru Noda; Hiroshi Matsuda, both of Tokyo, Japan

[73] Assignee: Mitsubishi Paper Mills Limited, Tokyo, Japan

[21] Appl. No.: 8,183

[22] Filed: Jan. 25, 1993

[30] Foreign Application Priority Data

Jan. 27, 1992 [JP] Japan .................................. 4-011907

[51] Int. Cl.[5] .................................................. B32B 3/00

[52] U.S. Cl. .................................... 428/195; 428/342; 428/402; 428/510; 428/511; 428/513; 503/227

[58] Field of Search ............... 428/511, 513, 510, 342, 428/402, 195, 694; 503/227

[56] References Cited

U.S. PATENT DOCUMENTS 4,085,949 4/1978 Asao .................................... 427/150
5,006,502 4/1991 Fujimura et al. .................... 503/227
5,233,924 8/1993 Ohba .................................. 101/483

*Primary Examiner*—Edith Buffalow
*Attorney, Agent, or Firm*—Cushman, Darby & Cushman

[57] ABSTRACT

This invention provides polypropylene-based resin-coated paper using paper as substrate and having excellent smoothness, especially the one which, when used for printing or heat transfer recording, keeps free from formation of white dots and occurrence of density unevenness in images, and thus is suited for printing use or heat transfer recording use. At least one side of the paper substrate is coated with a resin. The paper used as substrate is characterized by the fact that the unevenness in film thickness in machine direction (unevenness index) as measured by a film thickness meter is less than a specified value. The resin used for coating is a compounded resin composition comprising a polyethylene-based resin and a random polypropylene-based resin obtained by randomly copolymerizing principally ethylene and propylene, with the ethylene proportion being in a specified range, wherein the ratio by weight of the polyethylene-based resin to the random polypropylene-based resin is in a specified range, and the composition has been subjected to at least one round of kneading.

24 Claims, No Drawings

RESIN-COATED PAPER

This invention relates to a resin-coated paper having excellent smoothness, in which paper comprising natural pulp is used as substrate and one side of the paper substrate (hereinafter referred to as base paper) is coated with a polypropylene-based resin. More particularly, the invention pertains to a polypropylene-based resin-coated paper which is guaranteed against formation of white dots or occurrence of density unevenness in images and also has excellent printability.

Several technical proposals have been made on polypropylene-based resin-coated paper using a substrate comprising natural pulp. For example, U.S. Pat. No. 4,999,335 proposes an image-receiving element for thermal transfer and recording having as support a resin-coated paper prepared by coating the substrate with a resin comprising a 4:1 to 1:99 (by weight) blend of a polyethylene resin and a polypropylene-based resin. However, the resin-coated paper proposed in said U.S. patent is poor in smoothness, especially when the weight ratio of polypropylene resin to the resin blend exceeds 70% by weight, and the image-receiving element for thermal transfer and recordings using such resin-coated paper as support tends to suffer formation of white dots and density unevenness in images.

Japanese Patent Application Kokai No. 2-33399 (1990) proposes a resin-coated paper to be used for printing, in which the base paper is coated with a polypropylene-based resin containing 20 to 80% by weight of an inorganic filler. This resin-coated paper, however, is very bad in smoothness and, when printed, subject to formation of white dots and occurrence of density unevenness in images. In Japanese Patent Application Kokai No. 57-116339 (1982) is proposed a resin-coated paper for photography in which the base paper is coated with a polyolefin resin containing 15 to 30% by weight of a titanium dioxide pigment and 0.05 to 30% by weight of an oxide and/or a carbonate of an alkaline earth metal. This polypropylene resin-coated paper is also poor in smoothness.

Further, Japanese Patent Application Kokai No. 3-200139 (1991) proposes a polyolefin resin-coated paper for photography, whose thickness unevenness is limited within the specified values. However, the polypropylene resin-coated paper according to this proposal is also bad in smoothness and when it is used for printing, formation of white dots and occurrence of density unevenness in images are inevitable. When it is used for heat transfer recording, formation of white dots and occurrence of density unevenness in images are also inevitable.

Accordingly, the first object of this invention is to provide a polypropylene based resin-coated paper having excellent smoothness in which at least one side of the base paper comprising natural pulp is coated with a polypropylene-based resin.

The second object of this invention is to provide a polypropylene based resin-coated paper which is proof against formation of white dots and occurrence of density unevenness in images and has excellent printability.

The third object of this invention is to provide a polypropylene based resin-coated paper which is proof against formation of white dots and occurrence of density unevenness and can be advantageously used for heat transfer recording.

Other objects and advantages of this invention will become apparent from the following detailed description.

The present inventors have made efforts for solving said problems and, as a result, found that the objectives of this invention can be accomplished by providing a resin-coated paper in which one side of the base paper comprising natural pulp is coated with a specific resin, by using as base paper the one characterized by the fact that unevenness in film thickness in machine direction specified below Rpy (hereinafter referred to as unevenness index) is not more than 140 mV, and by using as said resin a compounded resin composition comprising a polyethylene resin and a random polypropylene resin prepared from random copolymerization of principally ethylene and propylene (the ethylene proportion being 1 to 10 mol %), the ratio by weight of polyethylene resin to random polypropylene resin being within the range of 1:99~30:70, said compounded resin composition having been subjected to more than one round of kneading.

The "unevenness index" (Rpy) referred to in the present specification is the value (unit: mV) determined in the following way. A sample is let run between a pair of spherical tracers, and by using a film thickness meter which measures the variation of thickness of the sample as an electrical signal through an electrical micrometer, the variation of thickness of the sample in the machine direction is measured by scanning the sample in the machine direction at a constant rate of 1.5 m/min, under the condition that the sensitivity range of the electrical micrometer is ±15 μm/±3V, and the hanning window and FFT is applied to the electrical signal to obtain the power spectrum (unit: $mV^2$) by FFT analyzer, and the obtained power value is integrated from 2 to 25 Hz, multiplied by $\frac{2}{3}$ and then raised to the one-half power. The thus determined value (unit: mV) is the unevenness index (Rpy).

Concretely, Rpy is determined as follows. The sample is let run between a pair of spherical tracers, about 5 mm in diameter, with a measuring pressure of about 30 g/stroke, and the variation of thickness of the sample is measured by scanning the sample in the machine direction at a constant rate of 1.5 m/min, under the condition of sensitivity range of electrical micrometer of ±15 μm/±3V, by using a film thickness meter mfd. by Anritsu Corp. which measures the thickness variation as an electrical signal through an electrical micrometer. The power spectrum is obtained by the electrical signal applying hanning window and FFT by the FFT analyzer CF-300 mfd. by Ono Sokki K. K. (input signal AC:±10 mV; sampling at 512 points) in the frequency region of 0-50 Hz, and the linear scale power spectrum (unit: mV) is determined by averaging of 128 times of integration. The square of the linear scale power value in the frequency region of 2-25 Hz is integrated and the obtained value is multiplied by $\frac{2}{3}$ and then raised to the one-half power. The other frequency analytical conditions follow the initial setting conditions of the FFT analyzer CF-300.

It was found that the object of this invention can be attained typically by using base paper whose unevenness index Rpy specified in the present specification is not more than 130 mV. It was also found that the object of this invention can be achieved more remarkably by using as base paper coating a compounded resin composition which has been subjected to at least two rounds of kneading. It was further found that the object of this invention can be accomplished even more remarkably by using a resin composition comprising a polyethylene-based resin and a random polypropylene-based resin blended in a ratio by weight of 5:95 to 20:80. It was also found that the object of this invention can be attained ideally by making the unevenness index Rpy of the resin-coated paper not more than 180 mV. The present invention was realized on the basis of these findings.

The base paper used in the present invention is the one whose unevenness index Rpy specified in this invention is not more than 140 mV, preferably not more than 130 mV, more preferably not more than 120 mV.

Various methods are available for producing the base paper whose unevenness index Rpy is not more than 140 mV. Usually, hardwood pulp composed of short fibers and suited for producing paper with smooth surface is used as main constituent, and the pulp mixture is beaten by a beater so that the content of long fibers will be minimized. Specifically, hardwood pulp such as described in Japanese Patent Application Kokai No. 60-69649 (1985) is used in an amount of 60% by weight or more, preferably 75% by weight or more, of the whole pulp mixture. Preferred examples of hardwood pulp for use in the present invention are LBSP, LBKP and LDP. Beating of pulp is preferably made in such a manner that the fiber length of the beaten pulp, as measured according to the JAPAN TAPPI Paper Pulp Testing Method No. 52-89 "Fiber Length Testing Method for Paper and Pulp", is 0.4–0.75 mm, preferably 0.45–0.7 mm, more preferably 0.45–0.65 mm, that the cumulative weight of the fibers with lengths of 1 mm or less will be 70% or more, and that the freeness of the beaten pulp will be 200–350 CSF. Then the thus treated pulp is worked into a web by a paper making machine so that the obtained web will have uniform formation, and the obtained web is calendered by a calendering machine such as machine calender, supercalender, thermal calender, etc. to obtain a base paper with unevenness index Rpy of not more than 140 mV.

The base paper used in the present invention is usually made by using a Fourdrinier machine. The thickness of the base paper is not specified in this invention, but in view of the touch and other qualitative factors, it is desirable that the base paper thickness is in the range of 20 to 250 μm, more preferably 30 to 200 μm.

As for the type of pulp constituting the base paper used in this invention, it is advantageous to use natural pulp properly selected as described above. As natural pulp, there is used wood pulp such as softwood pulp, hardwood pulp or a mixture thereof which has been subjected to a bleaching treatment with chlorine, hypochlorite, chlorine dioxide or the like, alkali extraction or alkali treatment, and if necessary oxidation bleaching with hydrogen peroxide, oxygen or the like, or a combination of these treatments. It is also possible to use various types of synthetic pulp such as craft pulp, sulfite pulp, soda pulp, etc.

In the base paper used in the present invention, various types of additives may be contained in course of preparation of slurry. As sizing agent, there can be used fatty acids and/or metallic salts of fatty acids, alkyl ketene dimmer emulsions or epoxidized higher fatty acid amides, such as described in Japanese Patent Application Kokai No. 62-7534 (1987), alkenyl- or alkylsuccinic anhydride emulsions, rosin derivatives and the like. As dry strength agent, there can be used anionic, cationic or ampholytic polyacrylamides, polyvinyl alcohols, cationized starch, vegetable galactomannan, etc. Polyamine-polyamido-epichlorohydrin resin, etc., can be used as wet strength agent. Clay, kaolin, calcium carbonate, titanium oxide and the like can be used as filler. Water-soluble aluminum salts such as aluminum chloride and alumina sulfate can be used as fixing agent, and sodium hydroxide, sodium carbonate, sulfuric acid and the like can be used as pH adjustor. It is also advantageous to contain these and other additives such as color pigments, dyes, fluorescent brightener and the like, such as described in Japanese Patent Application Kokai Nos. 63-204251 (1988) and 1-266537 (1989), in a proper combination.

Also, in or on the base paper used in the present invention, a composition consisting of various types of water-soluble polymer, antistatic agent and other additive(s) may be contained or coated by sizing press or tab-sizing press or by blade coating, air knife coating or other coating method. As water-soluble polymer, starch-based polymers, such as described in Japanese Patent Application Kokai No. 1-266537 (1889), polyvinyl alcohol-based polymers, gelatin-based polymers, polyacrylamide-based polymers, cellulose-based polymers and the like can be used. As antistatic agent, there can be used alkali metal salts such as sodium chloride and potassium chloride, alkaline earth metal salts such as calcium chloride and barium chloride, colloidal metal oxides such as colloidal silica, polystyrene sulfonates, and other organic anti- static agents. As emulsion or latex, there can be used petroleum resin emulsions, emulsions or latexes of the copolymers having as components at least ethylene and acrylic acid (or methacrylic acid), such as described in Japanese Patent Application Kokai Nos. 55-4027 (1980) and 1-180538 (1989), and emulsions or latexes of styrene-butadiene, styrene-acryl, vinyl acetate-acryl, ethylene-vinyl acetate and butadiene-methyl acrylate copolymers and their carboxy-modified versions. As pigment, clay, kaolin, calcium carbonate, talc, barium sulfate, titanium oxide and the like can be used. Hydrochloric acid, phosphoric acid, citric acid, sodium hydroxide and the like can be used as pH adjustor. It is advantageous to contain these and other additives such as above-mentioned color pigments, dyes and fluorescent brighteners in a proper combination.

The compounded resin composition used in the present invention consists essentially of a polyethylene-based resin and a random polypropyelene-based resin obtained from random copolymerization of principally ethylene and propylene, with the ethylene proportion being 1 to 10 mol %. The ratio by weight of the polyethylene-based resin to the random polypropylene-based resin is in the range of 1:99∼30:70, and the composition needs to be subjected to at least one round of kneading. If the above conditions are met, it is possible to use the compounded resins with various densities and melt flow rates (the melt flow rate regulated by JIS K 6758, hereinafter referred to as MFR), but usually it is advantageous to use a compounded resin having a density in the range of 0.885 to 0.905 g/cm$^3$ and MFR in the range of 10 to 45 g/10 min, preferably 15 to 25 g/10 min.

The ethylene in the random polypropylene-based resin comprising ethylene and propylene used in the present invention is of a proportion in the range of 1 to 10 mol %. When the ethylene proportion is less than 1 mol %, the resin-coated paper produced by using a compounded resin containing ethylene proves to be poor in smoothness and the intended effect of the present invention can not be obtained. On the other hand, when the ethylene proportion exceeds 10 mol %, there can not be obtained an appropriate random polypropylene-based resin and the resin-coated paper produced by using a compounded resin composition containing ethylene has may resin-solidified portions called resin gel and is bad in smoothness. The preferred ethylene proportion in the random polypropylene-based resin used in the present invention is in the range of 2 to 8.5 mol %. If necessary, other substance(s) copolymerizable with ethylene and propylene may be contained within limits not vitiating the effect of the present invention.

The ratio by weight of the polyethylene-based resin to the random polypropylene-based resin in the compounded resin composition used in the present invention should be in the range of 1:99~30:70. When the ratio of the polyethylene-based resin is less than 1 wt %, the melt extruding quality of said resin-coated paper may be deteriorated or the adhesion between base paper and resin layer of the resin-coated paper using said resin composition may be lowered, resulting in poor smoothness of the produced paper. On the other hand, when the ratio of the polyethylene-based resin exceeds 30 wt %, mixing of the polyethylene-based resin and the polypropylene-based resin is retarded, not only causing formation of resin gel over the resin-coated paper using said resin composition but also deteriorating smoothness of the paper. In view of the effect of the present invention and from comprehensive consideration, the preferred range of the ratio by weight of the polyethylene-based resin to the random polypropylene-based resin is 5:95~20:80. The density and melt flow rate of the polyethylene-based resin and the random polypropylene-based resin used in the present invention may range widely provided that the compounded resin composition used meets the above-defined conditions. In the present invention, beside a polyethylene-based resin and a random polypropylene-based resin, other resin or resins capable of forming a compound with said resins, for example a copolymer of α-methylstyrene and vinyltoluene, may be mixed within limits not prejudicial to the effect of the present invention.

As examples of polyethylene-based resin in the compounded resin composition used in the present invention, low-density polyethylenes, high-density polyethylenes, linear low-density polyethylenes, copolymers of ethylene and α-olefins such as propylene, butylene, etc., copolymers of ethylene and acrylic acid, methacrylic acid, methyl acrylate, methyl methacrylate or the like, and mixtures thereof may be mentioned. It is free to select density, melt flow rate and molecular weight of the component resins provided that the compounded resin composition meets the above-specified conditions. Usually, however, the resins having a density in the range of 0.90 to 0.97 g/cm$^3$, preferably 0.90 to 0.94 g/cm$^3$, and a melt flow rate as regulated by JIS K 6760 (hereinafter referred to as MI) of 0.3 to 45 g/10 min, preferably 1 to 35 g/10 min, are used singly or in combination.

The compounded resin composition comprising a polyethylene-based resin and a random polypropylene-based resin can be produced by subjecting the resin mixture to an ordinarily used kneader such as Banbury mixer or a kneading extruder such as double-screw extruder for kneading. Both of said kneading means may be used in combination. Kneading is preferably conducted at a temperature in the range of 190° to 275° C., preferably below 230° C., for preventing degradation of the resin. It is also recommendable to perform kneading in the presence of an antioxidant. The antioxidant used here is not subject to any particular restrictions. There can be used, for instance, those shown in Japanese Patent Application Kokai No. 1-105245 (1989), such as 3,5-di-tert-butyl-4-hydroxytoluene, tetrakis[methylene(3,5-di-tert-butyl-4-hydroxy-hydrocinnamate]methane and 2,6-di-tert-butyl-4-methylphenol. The kneading operation is preferably conducted as many times as possible within limits not causing thermal deterioration of the resin. The number of rounds of kneading to be conducted, however, needs to be decided by taking into consideration the required product quality and cost, but it is usually preferred to conduct kneading at least twice.

In order to improve adhesion of the resin A to the base paper, the resin-coated paper of this invention preferably includes an intermediate layer between the base paper and the resin A, the intermediate layer comprising a terpolymer of ethyhlene, maleic anhydride and (meth)acrylic ester. When using such a resin-coated paper having an intermediate layer, the resin layer hardly peels from the base paper in the step of cutting printing, heat transfer recording or handling. Thus, the resin coated paper rarely causes trouble in practical use. Therefore, the paper is very advantageously used for printing, heat transfer recording, etc.

The intermediate layer is preferably provided together with the resin A layer by co-extrusion. The ratio of the intermediate layer to the resin layer is preferably 1:10 to 3:1 by weight, more preferably 1:4 to 1:1. Though the kind of the ethylene-maleic anhydride(-meth)acrylic ester terpolymer in the intermediate layer is not critical, the terpolymer preferably contains maleic anhydride and (meth)acrylic ester in amounts of 0.1-5 mol % and 0.5-10 mol %, respectively. A concrete example of the terpolymer is ADTEX resin ET series (mfd. by Showa Denko K. K.).

The side of the base paper opposite from the side coated with a compounded resin composition is preferably coated with a resin having a film forming ability to afford desired water resistance, printing quality, etc., to the produced paper. As the film-forming resin, it is preferred to use a thermoplastic resin such as polyolefin, polycarbonate, polyester, polyamide or the like. From the comprehensive viewpoint, it is especially preferred to use a compounded resin such as mentioned above. Said side of the base paper may be coated with an electron radiation curable resin such as shown in Japanese Patent Application Kokoku No. 60-17104 (1985).

As means for uniformly coating the compounded resin composition on the base paper, it is recommended to employ a melt extrusion coating method in which the resin composition is cast onto the running base paper from a slit die of a melt extruder. Specifically, the resin is discharged out continuously from the die opening while controlling the temperature of the extruder parts such as barrel and die. The molten film temperature is preferably controlled at 280° to 335° C., more preferably 290° to 320° C. As the slit die, it is desirable to use a flat die such as T-die, L-die, fishtail die or the like. T-die is especially preferred. The slit opening is preferably adjusted to 0.1 to 2 mm. Use of an autoflex die is recommended.

Before coated with a resin composition, the base paper is preferably subjected to an activation treatment such as corona discharge treatment, flame treatment, etc. It is desirable to blow an ozone-containing gas to the molten resin composition on the side contacting the base paper and then coat the resin composition on the base paper as described in Japanese Patent Application Kokoku No. 61-42254. The resin layers on the front and back sides are preferably formed successively, in particular, continuously by a so-called tandem extrusion coating method. The resin layer may be of a multi-layer construction. Also, the resin layer of the resin-coated paper is worked into a gloss surface, a slightly rough surface described in Japanese Patent Application Kokoku No. 62-19732 (1987), a matte surface, a silky surface, or the like.

The thickness of the resin coating on the front side of the resin-coated paper according to this invention ranges preferably from 4 to 45 μm, more preferably from 6 to 35 μm. When the resin coating thickness is too small, adverse effect may be given to uniformness of resin coating, adhesion between resin and base paper, and smoothness of the produced resin-coated paper. On the other hand, when the resin coating thickness is too large, the touch and other paper qualities may be impaired. The coating thickness of a film-forming resin on the back side of the base paper is properly decided so that a good curling balance will be taken with the resin layer on the front side. Usually, it is in the range of 4 to 45 μm.

The resin-coated paper according to the present invention is preferably the one whose unevenness index Rpy defined in this specification is not more than 180 mV. When the unevenness index Rpy is greater than 180 mV, the resin coated paper, when used for printing, proves to be poor in smoothness and is subject to formation of white dots and occurrence of density unevenness in images. Therefore, it is more desirable that the unevenness index Rpy of the resin-coated paper according to the present invention is not more than 170 mV, more preferably not more than 160 mV, even more preferably not more than 150 mV. A resin-coated paper with an unevenness index Rpy of not more than 180 mV can be produced by uniformly coating a compounded resin composition such as mentioned above on an appropriate base paper.

Various kinds of additives may be contained in the front and back resin layers of the resin-coated paper of this invention. The additives include white pigments such as titanium oxide, zinc oxide, talc, calcium carbonate, etc., shown in Japanese Patent Application Kokoku Nos. 60-3430 (1985), 63-11655 (1988), 1-38291 (1989) and 1-38292 (1989) and Japanese Patent Application Kokai No. 1-105245 (1989), fatty acid amides such as stearic acid amide, arachidic acid amide, etc., metal salts of fatty acid such as zinc stearate, calcium stearate, aluminum stearate, magnesium stearate, zinc palmitate, zinc myristate, calcium palimitate, etc., phosphorus-, sulfur- and other types of antioxidants such as hindered phenols, hindered amines, etc., shown in Japanese Patent Application Kokai No. 1-105245 (1989), blue pigments and dyes such as cobalt blue, ultramarine, cerulean blue, phthalocyanine blue, etc., magenta pigments and dyes such as cobalt violet, fast violet, manganese violet, etc., fluorescent brighteners such as shown in Japanese Patent Application Kokai No. 2-254440 (1990), ultraviolet absorbers, etc. These additives may be contained in suitable combinations. preferably as a resin compound.

The back resin layer of the resin-coated paper according to this invention may be subjected to an activation treatment such as corona discharge treatment, flame treatment, etc., and provided with various types of additional coating for improving printability, antistatic properties and other paper qualities. In such a coating, there may be contained an inorganic antistatic agent, organic antistatic agent, hydrophilic binder, latex, hardening agent, pigment, surfactant, etc., such as shown in Japanese Patent Application Kokoku Nos. 52-18020 (1977), 57-9059 (1982), 57-53940 (1982) and 58-56859 (1983) and Japanese Patent Application Kokai Nos. 59-214849 (1984) and 58-184144 (1983), singly or in a suitable combination.

On the resin-coated papers of this invention are provided various heat transfer image-receiving layers to obtain heat transfer recording materials. Resins used for such image-receiving layers include resins having ester bonds such as polyester resins, poly(acrylic acid ester) resins, polycarbonate resins, polyvinyl acetate resins, polyvinyl butyral resins, polystyreneacrylate resins, and vinyltolueneacrylate resins; resins having urethane bonds such as polyurethane resins; resins having urea bonds such as urea resins; other resins such as polycaprolactam resins, styrene resin, polyvinyl chloride resins, vinyl chloride-vinyl acetate copolymer resins and polyacrylonitrile resins; ad mixtures or copolymers of the above-mentioned polymers.

The image-receiving layer may contain releasing agents, pigments, etc. in addition to the resins mentioned above. The releasing agent includes solid waxes such as polyethylene wax, amide wax and teflon powder; fluorine-based or phosphoric acid ester-based surfactants; silicone oils; and the like. Among these releasing agents, the silicone oils are especially preferable. The silicone oils can be used in the form of oil, but preferably in the form of cured products. Curable silicone oils may be of reaction-curable type, light-curable type, catalyst-curable type, etc. while the reaction-curable type is especially preferable. The reaction-curable type silicone oils include amino-modified silicone oils, epoxy-modified silicone oils, etc. The reaction-curable silicone oils are contained in the image-receiving layer preferably in an amount of 0.1-20% by weight. As the pigments, preferably used are extender pigments such as silica, calcium carbonate, titanium oxide and zinc oxide. The image-receiving layer has a thickness of preferably 0.5-20 μm, more preferably, 2-10 μm.

The present invention will hereinafter be described more particularly by showing the examples, which examples however are merely intended to be illustrative and not to be construed as limiting the scope of the invention.

EXAMPLE 1

By using the materials shown below, the samples of base paper were made under the given paper making conditions relating to average fiber length and freeness after beatening, linear pressure of calender, etc., which had been predetermined so that the base paper samples having the unevenness indices Rpy shown in Table 1 would be obtained.

A pulp mixture consisting of 70% by weight of hardwood bleached sulfite pulp and 30% by weight of hardwood bleached kraft pulp was beaten. To this beaten pulp there were added, per 100 parts by weight thereof, 3 parts by weight of cationized starch, 0.2 part by weight of anionized polyacrylamide, 0.4 part by weight of alkylketene dimer emulsion (calculated as ketene dimer) and 0.4 part by weight of polyamino-polyamido-epichlorohydrin resin to form a slurry. This slurry was carried on a Fourdrinier machine and formed into a web under appropriate turbulence. From this web, a paper with a basis weight of 140 $g/m^2$ was made and dried. In the course of drying, a size press liquor composed of 4 parts by weight of carboxy-modified polyvinyl alcohol, 4 parts by weight of sodium chloride, proper amounts of fluorescent brightener and blue pigment and 92 parts by weight of water was size pressed at a rate of 25 $g/m^2$, and the resulting product was dried so that the water content of the finally obtained base paper based on the bone dry weight would become 8 wt %, and then subjected to machine calendering and further to supercalendering to produce base paper for resin-coated paper.

Both sides of each sample of base paper thus obtained were subjected to corona discharge treatment, and then a coating resin composition selected from A to C shown below was melt extrusion coated at a resin temperature of 320° C. on both sides of base paper to a coating thickness of 25 μm. Melt extrusion coating was conducted according to the so-called tandem method in which extrusion coating is performed successively. Further, an ozone-containing gas was blown to the molten resin composition and then the resin layers were coated on the base paper. The resin layers of the resin-coated paper were worked into slightly rough surfaces and subjected to corona discharge treatment.

The coating resin compositions used in the above Example were as follows.

A (COMPOSITION USED IN THIS INVENTION)

A mixture of 20% by weight of a low-density polyethylene resin (density = 0.92 $g/cm^3$; MI = 6.0 g/10 min) and 80% by weight of a random polypropylene-based resin with ethylene content of 7 mol % (density = 0.90 $g/cm^3$; MFR = 28 g/10 min) was kneaded and extruded by a twin-screw kneading extruder. The extrudate was cooled and pelletized. 87.4 parts by weight of the thus produced compounded resin composition (density = 0.90 $g/cm^3$; MFR = 21 g/10 min), 12 parts by weight of a titanium dioxide pigment (anatase type, surface treated with hydrous aluminum oxide of 0.75% by weight, calculated as $Al_2O_3$, based on titanium dioxide) and 0.6 parts by weight of zinc stearate were kneaded by a Banbury mixer, cooled and pelletized to produce a compounded resin composition containing titanium dioxide pigment (the composition subjected to two rounds of kneading).

B (COMPARATIVE COMPOSITION)

24 parts by weight of a masterbatch consisting of 47.5% by weight of said low-density polyethylene resin, 50% by weight of said titanium dioxide pigment and 2.5% by weight of zinc stearate, 6.1 parts by weight of said low-density polyethylene resin and 69.9 parts by weight of said random polypropylene resin with ethylene content of 7 mol % were merely dry mixed (the composition not subjected to kneading).

C (COMPARATIVE COMPOSITION)

A compounded resin composition produced in the same way as A except that a homopolypropylene resin (density = 0.90 $g/cm^3$; MFR = 30 g/10 min) was used in place of the random polypropylene resin with ethylene content of 7 mol %.

Each sample of resin-coated paper made in the manner described above was subjected to a printing test by an offset printing tester. Each paper was solid printed with a blue ink TPS-300 (available from Toyo Ink Mfg. Co., Ltd.) in a cyanogen concentration of 0.85, and the white dots and density unevenness in images were visually observed. The results are shown in Table 1.

TABLE 1

| *1 | Sample No. | Thickness unevenness index of base paper, Rpy (mV)*2 | Kind of resin used for coating | Thickness unevenness index of resin coated paper Rpy (mV)*2 | White dots and degree of density unevenness in images*3 |
|---|---|---|---|---|---|
| ○ | 1 | 100 | A | 117 | ⊚ |
| | 2 | 100 | B | 269 | x |
| | 3 | 100 | C | 200 | x |
| ○ | 4 | 110 | A | 130 | ⊚ |
| ○ | 5 | 120 | A | 144 | ⊚ |
| | 6 | 120 | B | 301 | x |
| | 7 | 120 | C | 235 | x |
| ○ | 8 | 130 | A | 158 | ○ |
| | 9 | 130 | B | 320 | x |
| | 10 | 130 | C | 255 | x |
| ○ | 11 | 140 | A | 180 | Δ |
| | 12 | 140 | B | 344 | x |
| | 13 | 140 | C | 280 | x |
| | 14 | 150 | A | 206 | x |

*1 indicates the sample of this invention.
*2 Measured by the method specified in the present specification of the invention.
*3 Criterion for the rating is as follows.
◯: There were no or few (little), if any, white dots and density unevenness.
: There were seen a few white dots and slight density unevenness.
Δ: There were seen a considerable number of white dots and a considerable degree of density unevenness, but the sample could stand practical use.
x: There were seen many white dots and large density unevenness, and the sample was not suitable for practical use.

As noted from Table 1, the resin-coated paper of this invention, obtained by coating a compounded resin composition of this invention on a base paper with an unevenness index Rpy of not more than 140 mV, is smooth on the surface and free from the problem of white dots and density unevenness in images. It is also noted that in view of the improvement on white dots and density unevenness in images, the unevenness index Rpy of the resin-coated paper of this invention is preferably not more than 160 mV, more preferably not more than 150 mV. It is further noted that the base paper used in this invention should be the one whose unevenness index Rpy is not more than 140 mV, preferably not more than 150 mV, more preferably not more than 120 mV.

EXAMPLE 2

The procedure of preparing Sample No. 5 in Example 1 was followed except that the following coating resin compositions D–R were used in place of the one used for Sample No. 5 in Example 1.

D: The same as the resin composition (A) used in Example 1.

E: A compounded resin composition containing titanium dioxide pigment, the composition prepared by kneading 24 parts by weight of a masterbatch of titanium dioxide pigment consisting of 47.5% by weight of the low-density polyethylene resin used in Example 1, 50% by weight of the titanium dioxide pigment used in Example 1 and 2.5% by weight of zinc stearate, 6.1 parts by weight of said low-density polyethylene resin and 69.9 parts by weight of a random polypropylene resin with ethylene content of 7 mol %, and cooling and pelletizing the kneaded mass (the composition subjected to one round of kneading).

F: The same as the resin composition (A) of Example 1 except that a random polypropylene-based resin with ethylene content of 1 mol % was used in place of the random polypropylene-based resin with ethylene content of 7 mol %.

G: The same as the resin composition (A) of Example 1 except that a random polypropylene-based resin with ethylenene content of 2 mol % was used in place of the random polypropylene-based resin with ethylene content of 7 mol %.

H: The same as the resin composition (A) of Example 1 except that a random polypropylene-based resin with ethylene content of 4 mol % was used in place of the random polypropylene-based resin with ethylene content of 7 mol %.

I: The same as the resin composition (A) of Example 1 except that a random polypropylene-based resin with ethylene content of 8.5 mol % was used in place of the random polypropylene-based resin with ethylene content of 7 mol %.

J: The same as the resin composition (A) of Example 1 except that a random polypropylene-based resin with ethylene content of 10 mol % was used in place of the random polypropylene-based resin with ethylene content of 7 mol %.

K: The same as the resin composition (A) of Example 1 except that the amounts of the low-density polyethylene resin and the random polypropylene-based resin were 2% by weight and 98% by weight, respectively, instead of 20% by weight and 80% by weight in the composition (A).

L: The same as the resin composition (A) of Example 1 except that the amounts of the low-density polyethylene resin and the random polypropylene-based resin were 5% by weight and 95% by weight, respectively, instead of 20% by weight and 80% by weight in the composition (A).

M: The same as the resin composition (A) of Example 1 except that the amounts of the low-density polyethylene resin and the random polypropylene-based resin were 10% by weight and 90% by weight, respectively, instead of 20% by weight and 80% by weight in the composition (A).

N: The same as the resin composition (A) of Example 1 except that the amounts of the low-density polyethylene resin and the random polypropylene-based resin were 30% by weight and 70% by weight, respectively, instead of 20% by weight and 80% by weight in the composition (A).

O to R are the resin compositions outside the concept of the present invention.

O: A composition prepared in the same way as the resin composition (A) of Example 1 except that a random polypropylene-based resin with ethylene content of 0.5 mol % was used in place of the random polypropylene-based resin with ethylene content of 7 mol %.

P: A composition prepared in the same way as the resin composition (A) of Example 1 except that a random polypropylene-based resin with ethylene content of 12 mol % was used in place of the random polypropylene-based resin with ethylene content of 7 mol %.

Q: A composition prepared in the same way as the resin composition (A) of Example 1 except that the amounts of the low-density polyethylene resin and the random polypropylene-based resin were changed from 20 wt % and 80 wt % into 0.5 wt % and 99.5 wt %, respectively.

R: A composition prepared in the same way as the resin composition (A) of Example 1 except that the amounts of low-density polyethylene resin and the random polypropylene-based resin were changed from 20 wt % and 80 wt % into 40 wt % and 60 wt %, respectively.

TABLE 2

| *1 | Sample No. | Kind of resin used for coating | Thickness unevenness index of resin coated paper Rpy (mV)*2 | White dots and degree of density unevenness in images*3 |
|---|---|---|---|---|
| ○ | 15 | D | 144 | ◎ |
| ○ | 16 | E | 175 | Δ |
| ○ | 17 | F | 179 | Δ |
| ○ | 18 | G | 158 | ○ |
| ○ | 19 | H | 140 | ◎ |
| ○ | 20 | I | 155 | ○ |
| ○ | 21 | J | 172 | Δ |
| ○ | 22 | K | 172 | Δ |
| ○ | 23 | L | 153 | ○ |
| ○ | 24 | M | 145 | ◎ |
| ○ | 25 | N | 174 | Δ |
| | 26 | O | 207 | x |
| | 27 | P | 186 | x |
| | 28 | Q | 210 | x |
| | 29 | R | 310 | x |

In Table 2, *1 to *3 designate the same as in Table 1.

As evident from Table 2, the resin-coated paper of this invention, that is, the paper coated with a compounded resin composition of this invention, is smooth on the surface and has no problem of white dots and density unevenness in images. It is also noted that as regards the ethylene-containing random polypropylene-based resin in the compounded resin composition used in practicing the present invention, the practical content of ethylene in said random polypropylene-based resin is in the range of 1 to 10 mol %, preferably 2 to 8.5 mol %. Further, regarding the ratio of the polyethylene resin to the random polypropylene-based resin in the compounded resin composition used in practicing the present invention, it is noted that the practical ratio of said polyethylene resin to said random polypropylene-based resin is in the range of 1:99∼30:70, preferably 5:95∼20:80. It is also seen that the compounded resin used in the present invention needs to be subjected to at least one round, preferably 2 or more rounds of kneading.

The same procedure as in Sample 1 of Example 1 was repeated, except that an intermediate layer and an upper resin layer were formed on the base paper by coextruding the following resins and compositions at resin temperature of 290° C.

S: The resin composition (A) used in Example 1 was used for the upper resin layer and a copolymer of 92.5 mol % ethylene, 1.3 mole% maleic anhydride and 6.2 mol % ethyl acrylate having an MI of 12 g/10 min to form the upper resin layer 12 μm in thick and the intermediate layer 13 μm in thick.

T: The same procedure as in (S) above, except that the upper resin layer 19 μm in thick and the intermediate layer 6 μm in thick were formed.

U: The same procedure as in (S) above, except that the upper resin layer 21 μm in thick and the intermediate layer 4 μm in thick were formed.

Furthermore, the same layers as on the front side was formed on the back side of each sample.

Thereafter, the back side of each sample was subjected to corona discharge treatment, and thereon was coated a back coating composition containing gelatin, a matting agent of starch particles 2 μm in average diameter (gelatin:matting agent=1:1), an epoxy-based hardener in an amount of 15 wt % based on the gelatin, and proper amounts of a coating auxiliary and an inorganic antistatic agent so as to form a back coat layer in a proportion of 3 $g/m^2$ in terms of the gelatin. Thus, supports for heat transfer recording were obtained.

Subsequently, the front side of each sample was subjected to corona discharge treatment, and then thereon was coated and dried the following composition to form a image receiving layer having a coating weight 5 $g/m^2$ in terms of solid.

| Composition for image-receiving layer | |
|---|---|
| Saturated polyester resin TP-220 (mfd. by Nippon Gasei K.K.) | 10 parts by weight |
| Amino-modified silicon KF-393 (mfd. by Shinetsu Kagaku K.K.) | 0.5 part by weight |
| Solvent Xylene/methyl ethyl ketone (1/1) | 30 parts by weight |

Thus, an image-receiving sheet for heat transfer recording was obtained.

On the other hand, a heat transfer recording ink composition shown below as prepared.

| Heat transfer recording ink composition | |
|---|---|
| Heat-transferring dye "C.I. Solvent Blue 95" | 5 parts by weight |
| Polysulfone resin | 10 parts by weight |
| Chlorobenzene | 85 parts by weight |

The ink composition was coated on a polyester film 6 μm in thick, back side of which had been subjected to treatment for enhancing heat resistance. The coating was effected so as to attain coating weight of 1 $g/m^2$ in terms of solid. The thus coated film was dried to obtain a heat transfer recording sheet.

The resulting heat transfer recording sheet was put on the image-receiving sheet, and solid image recording was carried out by applying energy thereto, whereby the image-formed portion has an optical density (D) of 0.5.

The image-formed portion was observed regarding formation of white dots and density unevenness.

On the other hand, the image receiving sheet was allowed to stand at 35° C. for 4 days. Thereafter, the front resin layer was slowly peeled off from the base paper, and the side of the base paper which had adhered to the resin layer was observed to evaluate adhesiveness of the resin layer to the base paper.

The results are shown in Table 3.

TABLE 3

| Sample No. | Thickness unevenness index of base paper, Rpy*4 (mV) | Kind of resin used for coating | White dots and degree of density unevenness, Rpy*5 | Adhesiveness of resin layer to base paper *6 |
|---|---|---|---|---|
| 30 | 144 | A | ◯ | G3 |
| 31 | 145 | S | ◯ | G1 |
| 32 | 145 | T | ◯ | G1 |

TABLE 3-continued

| Sample No. | Thickness unevenness index of base paper, Rpy*4 (mV) | Kind of resin used for coating | White dots and degree of density unevenness, Rpy*5 | Adhesiveness of resin layer to base paper *6 |
|---|---|---|---|---|
| 33 | 144 | U | ◯ | G2 |

Note:
*4 designates the same as *2 in Table 1.
*5 ◯ means that white dot or density unevenness is not observed or observed little.
*6 G1 means that the surface of the base paper after peeling is unglossy and fluffy as a whole, which proves excellent adhesiveness of the resin layer to the base paper.
G2 means that the surface of the base paper after peeling is partially glossy, which proves good adhesiveness.
G3 means that the surface of the base paper after peeling is considerably glossy, which proves insufficient adhesiveness.
G4 means that the surface of the base paper is glossy and not fluffy overall, which proves bad adhesiveness.

As is clear from Table 3, on the polypropylene-based resin-coated paper having the intermediate layer between the base paper and the resin A, a transferred image can be obtained free from white dots and density unevenness. Moreover, such a resin-coated paper is excellent in adhesiveness of the resin layer to the base paper.

According to the present invention, as described above, there is provided polypropylene-based resin-coated paper using paper as substrate and having excellent surface smoothness, especially resin-coated paper which, when used for printing or heat transfer recording, is proof against formation of white dots and occurrence of density unevenness in images, and thus is suited for printing or heat transfer recording.

What is claimed is:

1. A resin-coated paper using as substrate a base paper comprising natural pulp, one side of said base paper being coated with a resin A, wherein said base paper has unevenness in thickness in machine direction (unevenness index) Rpy as specified below of not more than 140 mV, said resin A comprises a polyethylene-based resin and a random polypropylene-based resin which is obtained by randomly copolymerizing ethylene and propylene and has an ethylene content of 1 to 10 mol %, the ratio by weight of said polyethylene-based resin to said random polypropylene-based resin is in the range of 1:99–30:70, and said composition has been subjected to at least one round of kneading:

unevenness index Rpy: a value (unit: mV) determined in the following way: A sample is let run between a pair of spherical tracers, and by using a film thickness meter which measures the variation of thickness of the sample as an electrical signal through an electrical micrometer, the variation of thickness of the sample in the machine direction is measured by scanning the sample in the machine direction at a constant rate of 1.5 m/min, under the condition that the sensitivity range of the electrical micrometer is ±15 μm/±3V, and the hanning window and FFT is applied to the electrical signal to obtain the power spectrum (unit: $mV^2$) by FFT analyzer, and the obtained power value is integrated from 2 to 25 Hz, multiplied by $\frac{5}{8}$ and then raised to the one-half power.

2. A resin-coated paper according to claim 1, wherein the unevenness index Rpy of the paper is not more than 180 mV.

3. A resin-coated paper according to claim 1, wherein the surface of the coating resin layer on the side adhering to the base paper has been subjected to an ozone treatment.

4. A resin-coated paper according to claim 1, wherein the compounded resin composition has been subjected to 2 or more rounds of kneading.

5. A resin-coated paper according to claim 1, wherein the unevenness index Rpy of the base paper is not more than 130 mV.

6. A resin-coated paper according to claim 1, wherein the ratio by weight of the polyethylene-based resin to the random polypropylene-based resin is in the range of 5:95~20:80.

7. A resin-coated paper according to claim 1, wherein the resin A contains a pigment.

8. A resin-coated paper according to claim 1, wherein the pigment is titanium dioxide pigment.

9. A resin-coated paper according to claim 1, wherein the side of the base paper opposite from the side coated with the resin A is coated with a film-forming resin B.

10. A resin-coated paper according to claim 9, wherein the film-forming resin B is a polyolefin resin.

11. Resin-coated paper according to claim 10, wherein the polyolefin resin is a polypropylene-based resin.

12. A resin-coated paper according to claim 9, wherein the film-forming resin B coated on the side of the base paper opposite from the side coated with the resin A contains a pigment.

13. A resin-coated paper according to claim 12, wherein the pigment is titanium dioxide.

14. A resin-coated paper according to claim 1, said resin-coated paper being used for printing.

15. A resin-coated paper according to claim 1, the resin-coated paper being used for heat transfer recording.

16. A resin-coated paper according to claim 1, further comprising an intermediate layer between the base paper and the resin A, the intermediate layer comprising a terpolymer of ethylene, maleic anhydride and (meth)acrylic ester.

17. A resin-coated paper according to claim 16, the intermediate layer has been formed together with the resin A layer on the base paper by co-extrusion.

18. A resin-coated paper according to claim 15, wherein the side of the base paper opposite from the side coated with the resin A is coated with a film-forming resin B.

19. A resin-coated paper according to claim 18, wherein the film-forming resin B is a polyolefin resin.

20. Resin-coated paper according to claim 19, wherein the polyolefin resin is a polypropylene-based resin.

21. A resin-coated paper according to claim 18, wherein the film-forming resin B coated on the side of the base paper opposite from the side coated with the resin B contains a pigment.

22. A resin-coated paper according to claim 21, wherein the pigment is titanium dioxide.

23. A resin-coated paper according to claim 18, the resin-coated paper being used for printing.

24. A resin-coated paper according to claim 18, the resin-coated paper being used for heat transfer recording.

* * * * *